(12) United States Patent
DiEsposti

(10) Patent No.: US 7,579,986 B2
(45) Date of Patent: *Aug. 25, 2009

(54) METHOD AND SYSTEM FOR ALL-IN-VIEW COHERENT GPS SIGNAL PRN CODES ACQUISITION AND NAVIGATION SOLUTION DETERMINATION

(75) Inventor: Raymond S. DiEsposti, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 16 days.

This patent is subject to a terminal disclaimer.

(21) Appl. No.: 11/376,681

(22) Filed: Mar. 15, 2006

(65) Prior Publication Data

US 2007/0216575 A1    Sep. 20, 2007

(51) Int. Cl.
*G01S 1/02* (2006.01)
(52) U.S. Cl. .............................. 342/357.15; 342/357.09
(58) Field of Classification Search ............ 342/357.06, 342/357.09, 357.12, 357.15; 701/207, 213, 701/215
See application file for complete search history.

(56) References Cited

U.S. PATENT DOCUMENTS

| | | | |
|---|---|---|---|
| 4,809,005 A * | 2/1989 | Counselman, III | .......... 342/352 |
| 5,781,156 A | 7/1998 | Krasner | |
| 5,812,961 A | 9/1998 | Enge et al. | |
| 6,373,432 B1 | 4/2002 | Rabinowitz et al. | |
| 6,516,021 B1 | 2/2003 | Abbot et al. | |
| 6,914,931 B2 | 7/2005 | Douglas et al. | |
| 7,042,392 B2 | 5/2006 | Whelan et al. | |
| 2005/0156782 A1 | 7/2005 | Whelan et al. | |
| 2005/0159891 A1 | 7/2005 | Cohen et al. | |

FOREIGN PATENT DOCUMENTS

| | | |
|---|---|---|
| EP | 1 146 349 | 10/2001 |
| WO | WO 00/36431 | 6/2000 |

OTHER PUBLICATIONS

DiEsposti, et al., "The Proposed State Vector Representation of Broadcast Navigation Message for User Equipment Implementation of GPS Satellite Ephemeris Propagation," Federal Aviation Administration, ION National Technical Meeting 2004 Conference, Jan. 2004, pp. 1-19.

(Continued)

*Primary Examiner*—Dao L Phan
(74) *Attorney, Agent, or Firm*—Harness, Dickey & Pierce, P.L.C.

(57) ABSTRACT

A method and system of the present disclosure allow for a more robust detection of GPS satellite ranging signals based on a simultaneous, all-in-view coherent PRN code signal processing scheme rather than acquisition of GPS signals one at a time. Additionally, the method and system may enable 10 dB or more improvement in signal-to-ratio (SNR) acquisition performance of the combined signals when compared to conventional acquisition approaches of acquiring GPS PRN code signals one at a time. The method and system also automatically enables removal of ranging errors common to both the user and base station and minimizes the introduction of multipath errors into code phase measurements.

19 Claims, 2 Drawing Sheets

OTHER PUBLICATIONS

DiEsposti et al., "Dual-Use Personal NavCom Service," IEEE Aerospace Conference, Mar. 2000.

DiEsposti et al., "Open System Standards for Tightly Integrated GPS/PCS Systems: Issues and Trades," ION National Technical Meeting, Jan. 1999, pp. 733-739.

DiEsposti et al., "The Benefits of Integrating GPS, INS, and PCS," ION GPS-98 conference, Sep. 1998, pp. 327-331.

DiEsposti et al., "Of Mutual Benefit: Merging GPS and Wireless Communications," GPS World Magazine, Apr. 1998, pp. 44-48.

J.B. Lozow, "Analysis of Direct P(Y)-Code Acquisition," Navigation: Journal of the Institute of Navigation, vol. 44, No. 1 Spring 1997, pp. 89-97.

Len Sheynblat et al., "Description of a Wireless Integrated SmartServer™/Client System Architecture," ION 55th Annual Meeting, Jun. 28-30, 1999, Cambridge, MA, pp. 667-675.

Raymond DiEsposti, "GPS PRN Code Signal Processing and Receiver Design for Simultaneous All-in-View Coherent Signal Acquisition and Navigation Solution Determination," ION NTM 2007, Jan. 22-24, 2007, San Diego, CA, pp. 91-103.

Kaniuth, et al., "A Snap-Shot Positioning Approach for a High Integrated GPS/Galileo chipset," ION GNSS 18th International Technical Meeting of the Satellite Division, Sep. 13-16, 2005, Long Beach, CA, pp. 1153-1159.

Product Information for Rino 110 GPS Receiver, www.garmin.com/products/rino—Printed Jun. 13, 2006, 2 Pages.

\* cited by examiner

METHOD AND SYSTEM FOR ALL-IN-VIEW COHERENT GPS SIGNAL PRN CODES ACQUISITION AND NAVIGATION SOLUTION DETERMINATION

FIELD

The present invention relates to a method and system for global positioning (GP). More specifically, the present invention relates to a method and system for acquiring global positioning system (GPS) signals from satellites to determine a location of a GPS user receiver.

BACKGROUND

For decades, the ability to obtain real time location and position information for mobile platforms and/or individuals has been a highly sough after technology. Since the implementation of the Global Positioning System (GPS), a worldwide radio navigation system introduced by the U.S. Air Force, this has become a reality. The GPS includes a constellation of satellites, ground or base stations, and at least one GPS user receiver.

The locations of the satellites are used as reference points to calculate positions of the GPS user receiver, which is usually accurate to within meters, and sometimes even within centimeters. Each of the satellites, the ground stations, and the GPS user receiver has preprogrammed timed signals that start at precise times. In order to lock on to the signals broadcasted by the satellites, the ground station and GPS user receiver slew their respective internal generated signals relative to time as predicted by their respective internal clocks. When the signals are locked, the GPS user receiver makes ranging measurements to each satellite called pseudoranges. These pseudorange measurements include the actual ranges to the satellites, in addition to an error associated with the receiver clock time offset relative to GPS time, plus other smaller errors. The ground stations included in the GPS control segment network provide ranging measurements which are used to generate predictions for the satellites clocks and orbits. These predictions are periodically uploaded to the satellites and the satellites broadcast this data to the user receiver to support the user receiver positioning function.

Each satellite transmits a GPS satellite signal, including a unique Pseudo-Random Noise (PRN) Code and a Navigation (Nav) message, on two carrier frequencies, L1 and L2. The L1 carrier is 1575.42 MHz and carries both the Nav message and the pseudo-random noise code for timing. The L2 carrier is 1227.60 MHz. The L2 signal is normally used for military purposes and is a more precise and complicated pseudo-random noise code. There are two types of PRN codes, called Coarse Acquisition (C/A) code and Precise (P) code. The C/A code, intended for civilian use, modulates the L1 carrier at a rate of 1.023 MHz and repeats every 1023 bits, thus the length of the C/A code is one millisecond. The P code, intended for military use, repeats on a seven-day cycle and modulates both the L1 and L2 carriers at a 10.23 MHz rate. When the P code is encrypted, it is called the "Y" code. Additionally, the Nav message is a low frequency signal added to the codes on L1 and L2 that gives information about the satellites' orbits, their clocks corrections and other system status. Ideally, as the GPS satellite ranging signals are broadcast to Earth, the GPS satellite ranging signals would directly reach the GPS user receiver with a range delay associated with speed of light propagation through a vacuum in an inertial reference system. However, along the route to the GPS user receiver, the GPS satellite ranging signals encounter some sources that cause the GPS satellite signals to be delayed in addition to the path delay associated with the speed of light propagation relative to range prediction models, and thus in error. The potential sources of such delays and errors include satellite ephemeris and clock errors, selective availability (SA), ionospheric and atmospheric effects, multi-paths, and receiver clock error.

In order to reduce or eliminate the delays and errors in the GPS satellite ranging signals, other ground stations, called differential GPS ground stations, are often used. Each differential ground station is stationary and ties all the satellite signal measurements into a local reference. Additionally, a differential ground station closest to the GPS user receiver receives the GPS satellite ranging signals containing the same delays and errors related to the GPS satellite signals as the GPS satellite signals acquired and tracked by the GPS user receiver for the same epoch time. The differential ground station is typically within a few tens of kilometers of the GPS user receiver. The differential ground station measures the range delay or timing errors and then provides this correction information to the GPS user receiver over a radio frequency (RF) wireless communications link. The GPS user receiver may be stationary for the time being, or may be roaming. The GPS user receiver applies these corrections to its ranging measurements to reduce the above errors. The differential ground station knows its fixed position and calculates an expected travel time for each GPS satellite signal. The calculation is based on a broadcast ephemeris of where each satellite should be positioned in space. The differential ground station compares a calculated travel time for the satellite ranging signals to an actual travel time measured for the signals, for all the satellites to determine the error correction information related to the signals for each satellite. The differential ground station then transmits the error correction information for each satellite to the GPS user receiver.

For conventional signal processing, when the GPS user receiver is first turned ON or activated to begin processing GPS signals, it searches for, acquires and locks on to the GPS satellite ranging signals from multiple satellites in view. The GPS user receiver also make distance measurements (called pseudoranges) for each satellite PRN code signal in view of the GPS user receiver, demodulate the Nav message data superimposed on the PRN code signals, apply any error corrections sent to it from the ground station if operating in the differential GPS mode, and uses this information to solve for the GPS user receiver's position and user receiver clock offset relative to GPS time. Additionally, in order to determine the distance between any satellite in view and the GPS user receiver, the GPS user receiver determines the actual travel time for the signal propagation delay and applies the error correction information received from the base station to calculate corrected travel time. The corrected travel time is then multiplied by the speed of light to determine the distance to the signal sending satellite. After acquiring the GPS satellite ranging signals of at least four satellites, the GPS user receiver solves for its position and time error relative to GPS time.

The conventional method of acquiring the GPS satellite ranging signals provides for the GPS user receiver to acquire one GPS satellite signal at a time. Signal acquisition is generally the most fragile phase associated with the GPS user receiver. One reason is that the C/A code is weak and a small level of interference, intermittent attenuation, or obstruction of the Line-of-Sight (LOS) from a satellite to the GPS user receiver can cause the acquisition process to fail for one or more of the ranging signals.

It would therefore be desirable to even further improve the ranging signal acquisition process in a manner that better ensures that rapid, reliable and robust acquisition of the ranging signals can be made by a GPS user receiver in challenged environments associated with signal power attenuation or interference, e.g. in-doors, under foliage, or under jamming conditions.

SUMMARY

The present disclosure provides a method and system to detect and acquire simultaneously a plurality of satellite ranging signals from each of a plurality of satellites in view of a GPS user receiver while simultaneously estimating a location of the GPS user receiver.

The method involves using inputs from the plurality of satellites that are in view of a global positioning system (GPS) user receiver. A wireless assist signal from a differential base station is used to provide to the GPS user receiver a set of initialization data, user location assist data, and a GPS time synch function to limit an Earth-referenced search space grid. Searching over the search space grid is performed while utilizing the initialization and user location assist data, and the GPS time synch function, to acquire simultaneously the plurality of satellite ranging signals from the plurality of satellites in view of the user receiver.

A further aspect of the method includes providing frequency aiding to reduce or eliminate the frequency search space and enable longer coherent integration times for user receiver signal processing. Additionally, the method involves adjusting signal phases for each of the plurality of satellite ranging signals received for any change in satellite motion since epoch time. Furthermore, the method provides coherently combining a plurality of received satellite ranging signals at each grid point location to produce a power output corresponding to a combined power of the plurality of satellite ranging signals processed. A determination is then made as to whether the combined power output indicates a probable location for the GPS user receiver.

A global positioning system (GPS) using inputs from a plurality of satellites in view of a GPS user receiver is also provided. The system includes a plurality of GPS satellites, a station, and at least one GPS user receiver. The plurality of GPS satellites is configured to produce a plurality of GPS satellite ranging signals, wherein each GPS satellite signal includes a PRN code. Additionally, the base station is configured to generate a set of initialization data to limit a search to a predetermined search area grid. The base station is further configured to receive the plurality of GPS satellite ranging signals to produce time and frequency aiding data. This helps to reduce the search space to aid acquisition of the plurality of GPS satellite ranging signals and reduce the size of the search space or extend the duration of signal processing coherent integration time. The GPS user receiver is in wireless communication with the plurality of satellites and the base station. The GPS user receiver is configured to receive the plurality of GPS satellite ranging signals from the plurality of satellites in view along with the time and frequency aiding data, and to search over at least one carrier phase combination within the search area grid at a grid point location. The GPS user receiver is further configured to coherently combine the plurality of GPS satellite ranging signals from the plurality of satellites in view, and produce a power output. Using the power output, the GPS user receiver simultaneously estimates its location by selecting that one grid point which corresponds to the maximum combined signal power over all of the search grid points.

The method and system of the present disclosure allow for a more robust detection of GPS satellite ranging signals based on a simultaneous, all-in-view coherent PRN code signal processing scheme rather than acquisition of GPS signals one at a time. Additionally, the method and system may enable 10 dB or more improvement in signal-to-ratio (SNR) acquisition performance of the combined signals when compared to conventional acquisition approaches of acquiring GPS PRN code signals one at a time. The method and system also automatically enables removal of ranging errors common to both the user and base station and minimizes the introduction of multipath errors into code phase measurements.

Further areas of applicability of the present invention will become apparent from the detailed description provided hereinafter. It should be understood that the detailed description and specific examples, while indicating various preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of various embodiments is merely exemplary in nature and is in no way intended to limit the present disclosure, its application, or uses.

Figure 1:
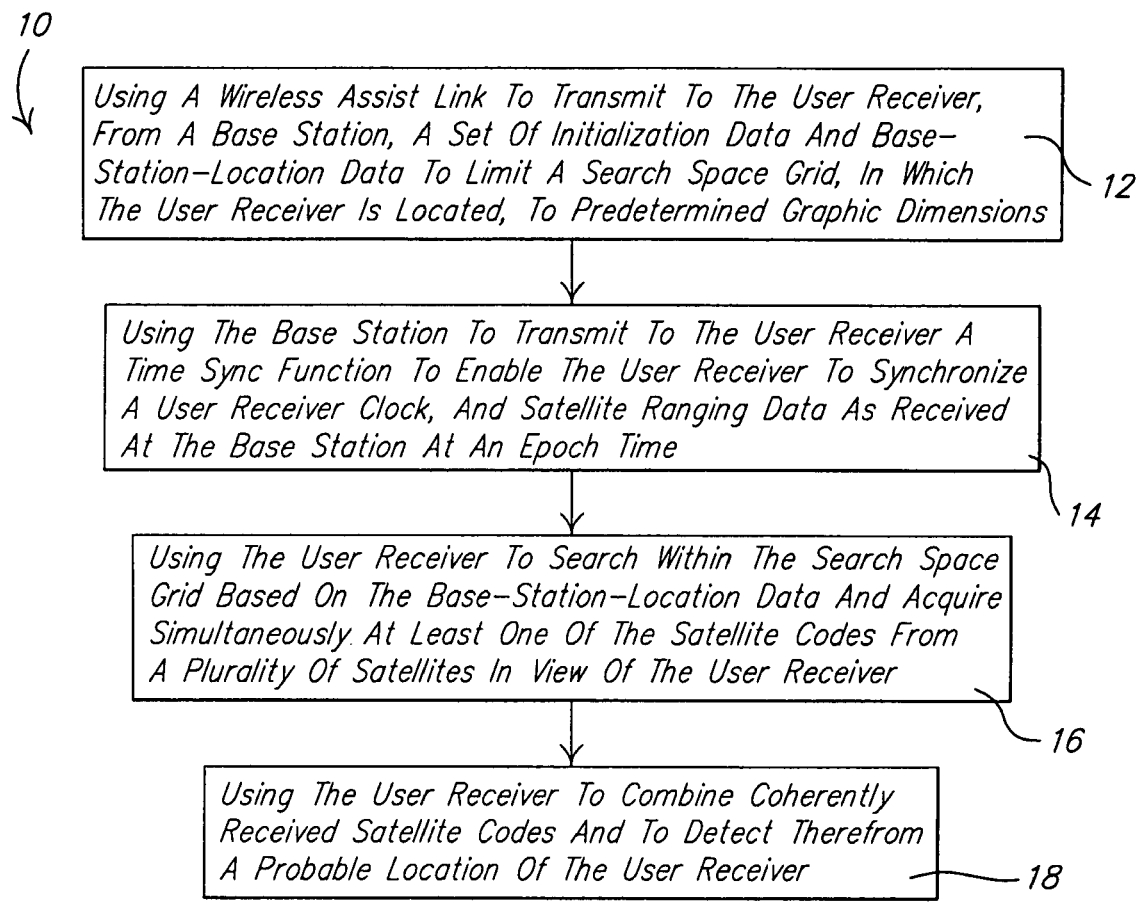
FIG. 1 is a flow chart of a method of the present disclosure for using inputs from a plurality of satellites that are in view of a global positioning system (GPS)

Referring to FIG. 1, the present disclosure illustrates a method 10 for using inputs from a plurality of satellites that are in view of a global positioning system (GPS). The plurality of satellites includes at least three satellites up to all satellites in view of the user receiver. The method includes using a wireless assist link to transmit to the user receiver, from a base station, a set of initialization data and base-station-location data at operation 12. The set of initialization data includes almanac or satellite ephemeris and clock data, size or boundary data, and satellite ranging signal data including satellite ranging signal measurement data. The boundary data comprises predetermined geographic dimensions to limit a search space grid, in which the user receiver is located. At operation 14, the method also provides using the base station to transmit to the user receiver a GPS time synch function to allow the user receiver to synchronize its internal clock, and satellite ranging data as measured at the base station and used to synchronize reception of the satellite codes in view of the user receiver.

After the GPS time synch function and other transmitted data are received by the user receiver, the user receiver starts within the search space grid based on the set of initialization data provided by the base station, and acquires simultaneously a satellite code from each of the plurality of satellites in view of the user receiver, as indicated at operation 16. Even more, the user receiver may acquire all of a plurality of satellite PRN codes simultaneously from all satellites in view of the user receiver. At operation 18, while the user receiver is searching grid points in the search space grid, it coherently combines a power output of each received satellite PRN code to determine a probable location of the user receiver. More specifically, the user receiver searches the search space gird, sums coherently the power output related to each received satellite code for a plurality of grid point locations within the search space grid, and determines which grid point provides a maximum combined power output for the received satellite codes. The maximum combined power output indicates a highest combined power output at a particular grid point location to identify the probable location of the user receiver.

Figure 2:
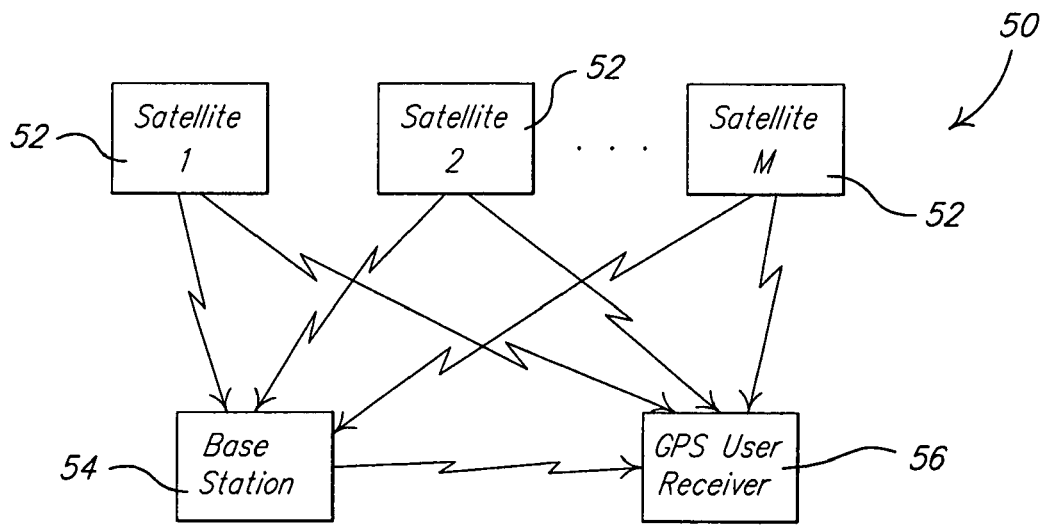
FIG. 2 is a block diagram of an exemplary system used to implement the method of FIG. 1.

Referring to FIG. 2, a global positioning system (GPS) 50 of the present disclosure is shown for implementing the above-described operations. The GPS 50 comprises a plurality of GPS satellites 52, a base station 54, and a GPS user receiver 56. The satellites 52 are each in wireless communication with the user receiver 56 and the base station 54. Additionally, the base station 54 is in wireless communication with the user receiver 56.

The locations of the satellites 52 are used as reference points to assist signal processing in order to determine the location of the user receiver 56. The satellites 52 comprise a constellation of "M" number of satellites in the Earth's orbit that are in view of the user receiver 56. Each one of the satellites 52 broadcasts one or more precisely synchronized GPS satellite ranging signals toward the Earth. The GPS ranging satellite signals include a Pseudo Random Noise (PRN) Code and Navigation (Nav) message carried on carrier frequency, such as an L1 and/or L2 carrier frequency. The L1 carrier is 1575.42 MHz and carries both the Nav message and the PR code for timing. The L2 carrier is 1227.60 MHz.

There are two types of PRN codes called Coarse Acquisition (C/A) code and Precise (P) code. The C/A code, intended for civilian use, modulates the L1 carrier at a rate of 1.023 MHz and repeats every 1023 bits. The P code, intended for military use, repeats on a seven-day cycle and modulates both the L1 and L2 carriers at a 10.23 MHz rate. When the P code is encrypted, it is called the "Y" code. Additionally, the Nav message is a low frequency signal added to the PRN codes that gives information about its satellite's orbit, clock corrections and other system status information.

As technology progresses, the satellites 52 may include more civilian and military codes on the L1 and L2 carriers and an additional carrier frequency called L5. For example, a satellite 52 may include two military codes and one civil signal code on the L1 carrier, two military codes and one civil signal code in on the L2 carrier, and two civil codes on the L5 carrier. Additionally, instead of GPS navigation system satellites 52, the satellites 52 may comprise other existing satellite navigation systems satellites, such as, for example, Wide Area Augmentation System (WAAS) satellites developed by the Federal Aviation Administration (FAA) and the Department of Transportation (DOT) or Galileo satellite radio navigation system satellites, an initiative launched by the European Union and the European Space Agency. Without loss of generality, the system 50 may incorporate GPS codes, or codes of other satellite navigation system signals, if available, e.g. an integrated GPS-Galileo user receiver.

The base station 54 comprises a ground station that is a stationary receiver located at an accurately surveyed point. The base station 54 receives the GPS satellite ranging signals from each of the satellites 52. As each GPS satellite ranging signal is received by the base station 54 and the user receiver 56, the satellite signals may be adversely affected by ionosphere or atmospheric conditions, error in the GPS broadcast ephemeris and clock data, by multipath conditions, or other factors that may cause errors in the ranging signals reaching the base station 54 or the user receiver 56. The base station 54 transmits additional aiding data such as an unique set of initialization data, base-station-location data and size or boundary data. The set of initialization data includes GPS almanac or satellite ephemeris and clock data, and PRN ranging data including base station ranging measurements as received at the base station 54. The boundary data comprises predetermined geographic dimensions to limit a search space grid in which the user receiver 56 is located.

The user receiver 56 searches within the search space grid based on the base-station-location data and acquires simultaneously at least one of the satellite codes from the satellites 52 in view of the user receiver 56. Additionally, the user receiver 56 may acquire simultaneously all of the satellite ranging codes from all of the satellites in view of the user receiver 56 in order to combine coherently, such as summing coherently, received satellite codes and to detect therefrom a probable location of the user receiver 56. The user receiver 56 coherently combines, or sums, a power output of each of received GPS ranging signals at each of the plurality of grid point locations within the predetermined geographic area, to determine a maximum power output value. The user receiver 56 uses the maximum power output value to extrapolate a probable location of the user terminal. The maximum power output value is indicative of a highest summed power output of all PRN codes present for each of the grid point locations, that identifies the probable location of the user receiver 56. The following paragraphs more specifically describe the functionally of the user receiver 56.

Through the wireless assist link, the user receiver 56 receives the set of initialization data to aid acquisition along with the base-station-location data, and the boundary data to assist in the acquisition search. Additionally, over the wireless link, the user receiver 56 is provided the GPS time synch function to reduce the search space grid associated with an unknown user clock error. The user receiver 56 also receives data on the accuracy of the time synch for use in the search from the base station 54, or time synch accuracy is inferred by the user receiver 56 based on the boundary data. Additionally, the user receiver 56 may utilize a time aiding function and a frequency aiding function to reduce user receiver clock error in order to reduce time search space.

The time aiding function may take on several forms, such as GPS time transfer or time sampling control method. The time transfer method provides a GPS time synch function to the user receiver 56 using an external RF aiding signal. On the other hand, the time sampling control method includes the base station 54 providing a command to the user receiver 56 to sample the GPS satellite ranging signal at a time epoch close to a time epoch used by the base station 54 to measure the GPS satellite ranging signals.

Frequency aiding may be implemented by the user receiver 56 by implementing signal phase or frequency lock (e.g. phase lock loop (PLL)) onto a base station radio frequency (RF) carrier signal. If a base station signal is generated using a high-quality ovenized crystal oscillator (OCXO), the user receiver PLL will provide a frequency reference that is accurate and stable enough to reduce or eliminate frequency search. The user receiver PLL frequency reference will also support coherent integration times up to one second duration, following compensation for Doppler and motion of each of the satellites 52 relative to the user receiver 56.

Using the almanac or ephemeris data, the user receiver 56 determines the number of GPS-satellite-ranging code signals in view for use to determine its location within the search space grid. The search space grid comprises a two-dimensional search grid. The search space grid alternately may comprise a three-dimensional search grid. For example, in order to determine a location for the two-dimensional search space grid, at least three satellites 54 in view of the user receiver 56 will be needed. On the other hand, at least four satellites 54 are needed in order to determine a location of the user receiver 56 within a three-dimensional search grid. Additionally, the user receiver 56 adjusts PRN coders to predictable offsets given by the following Equations or a variation thereof, to correlate simultaneously the GPS satellite PRN code signals received from each of the "M" satellites 52 in view in order to simultaneously detect the presence of all of the signals at some probable grid point location.

Figure 3:
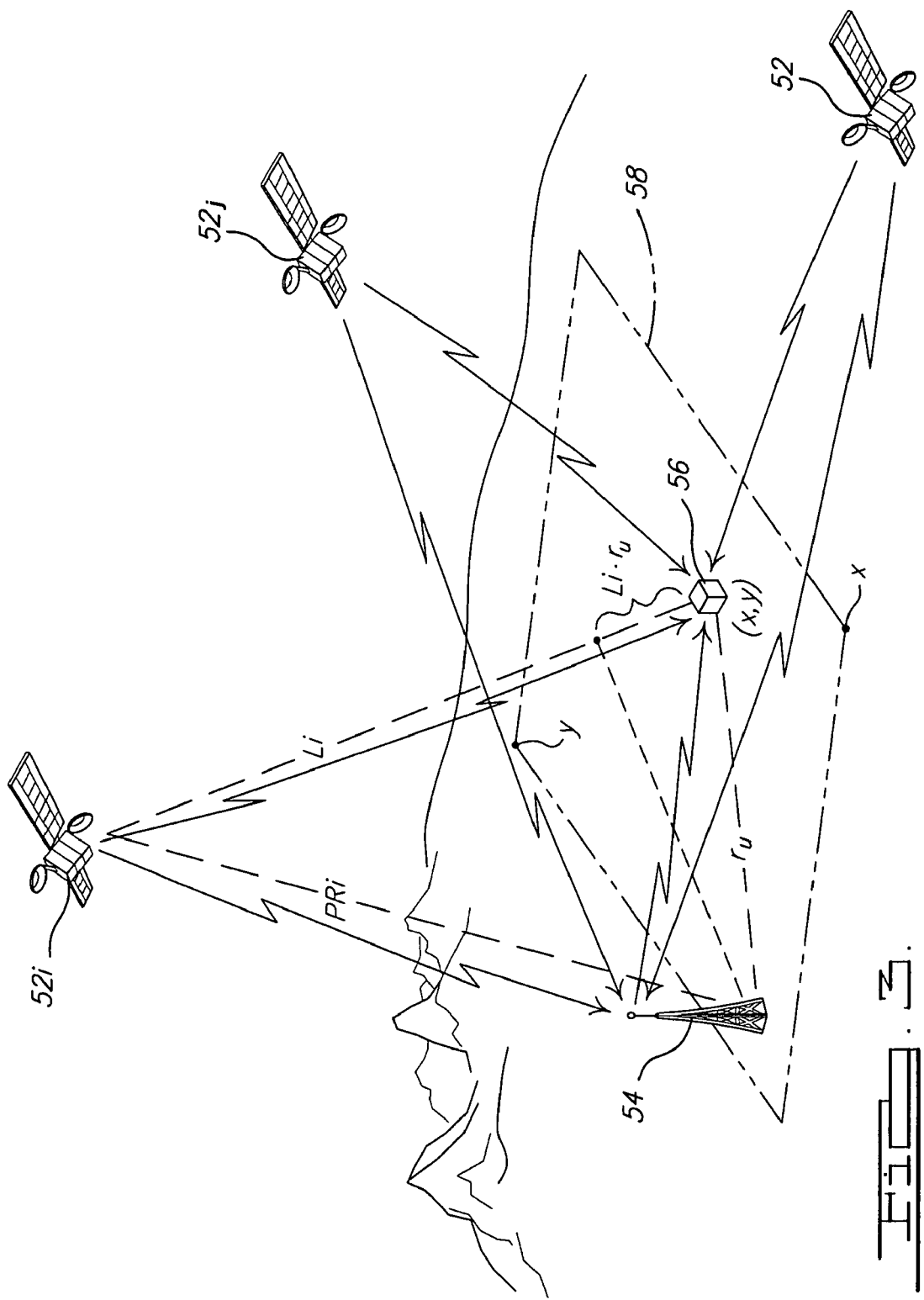
FIG. 3 is a graph illustrating an example of a two-dimensional search area used to acquire simultaneously the ranging signal inputs from all of the satellites.

Referring to FIG. 3, the search space grid 58 includes a set of search space grid points (x, y) that can be spaced about ¼ to ½ PRN code chip apart (a L1 C/A code chip corresponds to about 300 meters for C/A code and a P code chip corresponds to about 30 meters for P(Y) code). If the dimensions of the two-dimensional search region are about 10 km×10 km, then the number of search points are about 5,000 to 20,000 for C/A code chips. Additionally, reduction in the initial search region enables significant computation savings. For example, a 1 km×1 km region allows a factor of 100 savings, or only 50 to 200 grid points for C/A code chips.

Again referring to FIG. 3, the received code phases at the location of the user receiver 56 which are offset by a vector $\vec{r}_U$ from the base station 54 will include a range offset relative to the base station 54 of magnitude $\hat{L}i \cdot \vec{r}_U$, where $\hat{L}i$ is the Line-Of-Sight (LOS) unit vector to satellite "i". Thus, the set of N satellite PRN code pseudo range (PR) measurements received by the user receiver 56 relative to the base station 54 at epoch time $t_0$ is given by:

$$\hat{L}i \cdot \vec{r}_U + b = (PRi)_U - (PRi)_{BS}, i=1, 2, \ldots, N \quad \text{(Equation 1)}$$

where "b" is an unknown parameter that represents an unknown offset in a user receiver clock relative to the GPS time. "N" consists of all of the PRN code signals used in the processing summed from up to "M" satellites 52 in view. The relative code phase between two GPS PRN code signals "i" and "j" at epoch time $t_0$ is defined as the following:

$$\Phi_{ij}(to) = PRi(to) - PRj(to) \quad \text{(Equation 2)}$$

where the PRN code ranging measurements i and j may be obtained from two different PRN code signals related to the same satellite 52i or two different PRN code signals obtained from two different satellites 52i, 52j. The relative code phase between two PRN code signals from the same satellite 52 will be almost identical. If the PRN code signals are obtained from two different frequencies from the same satellite 52i, the relative code phase may include an inter-frequency bias.

The difference between relative code phases as seen by the user receiver 56 and the base station 54 is given by:

$$\Delta\Phi_{ij}(to) = (\Phi_{ij})_U - (\Phi_{ij})_{BS} \quad \text{(Equation 3)}$$

Substituting Equation 2 into Equation 3 and using Equation 1 to simplify the results gives:

$$\Delta\Phi_{ij}(to) = \{\hat{L}i(to) - \hat{L}j(t0)\} \cdot \vec{r}_U \quad \text{(Equation 4)}$$

The unknown user clock offset parameter "b" drops out of the differential relative code phase expression given by Equation 4. The Equations above, or a variation thereof, are used to predict the relative code phases within the user receiver 56, as the user receiver 56 simultaneously searches, acquires and combines the power from "N" GPS PRN signals in view for the "M" satellites 52. This enables the user receiver 56 to acquire simultaneously "N" PRN codes up to all of the PRN codes for each satellite in view of the user receiver 56 for example, by using N correlators of the user receiver 56 and synchronizing corresponding N PRN code generator outputs chip sequences to phase offsets as given by the relative code phases predicted at a grid point.

The LOS unit vector $\hat{L}i$ can be computed within the user receiver 56 using the almanac or ephemeris data of one of the satellites 52, base station location, and GPS time information, as provided by the base station 54. The LOS unit vector is typically assumed to be the same at both the base station 54 and the user receiver 56. Thus, for practical applications, the timing error between the base station 54 and the user receiver 56 should not exceed about 1 millisecond. A much smaller time synch error, however, is beneficial for reducing the search space associated with receiver clock error. Ideally, the time synch function provided by the base station 54 is accurate to one microsecond or less. This error, however, will also be limited by a size of the search space grid 58.

Once the aiding data is sent to the user receiver 56, the user receiver 56 uses the above equations, or a variation thereof, to solve for the unknown parameter of the user receiver location relative to the base station 54 for the two-dimensional solution $\vec{r}_U = (X, Y)$ for the two-dimensional search grid. Alternatively, if the search space grid 58 comprises the three-dimensional earth-referenced grid, a three-dimensional solution $\vec{r}_U = (X, Y, Z)$ is provided.

Alternatively, a variation of the above Equations allows determination of an absolute user receiver location (e.g. a location relative of the user receiver 56 to an Earth reference centered coordinate system, instead of the base station 54) within the search space grid 58. This absolute location can be obtained by adjusting the N correlators by using the relative code phases at each grid point, as predicted from the satellite ephemeris and clock data, and GPS time synch information supplied from the base station 54, within the processing method of the user receiver. However, this method may further require compensation for the ionospheric delay, which may be a sizable fraction of a code chip.

With static conditions over a small interval, or with frequency and Inertial Measurement Unit (IMU) aiding, the user receiver 56 may also coherently process multiple measurements over an extended interval of time. In such a formulation, other parameters can be added to improve performance. The GPS processing adjusts the PRN coder and signal phase for any change in the satellite motion over the correlation interval relative to the GPS epoch time $t_0$. This adjustment can be determined using the satellite ephemeris and clock data.

In order to coherently combine all PRN code signals, the user receiver 56 performs a combinatorial search over each signal carrier phase angle possibility associated with each PRN code at an initial measurement epoch time. The combinatorial search extends over all of the carriers phase combinations associated with the "N" PRN codes processed. That one carrier phase combination, grid point and user receiver clock combination that produces the strongest "spike" in the combined PRN code signal power output relative to noise level, e.g. a summed output from the "N" PNR code correlators that perform a slaved, relative code phase synchronized search as described above, indicates the most probable user receiver location. This search also includes a search over user clock error and a combinatorial search over all carrier phase combinations for all PRN code signals at each grid point. Additional information, such as knowledge of nominal code received power level, estimated noise level in each frequency band, satellite LOS attenuation due to the user receiver's 56 gain pattern relative to an attitude reference, and known LOS obstructions may be useful for eliminating signals and reducing the number of combinations, or weighing the power outputs to improve solution speed or performance. This information can also enable calculation of a suitable threshold to predict the reliability of computed solution operation performed by the user receiver 56.

The user receiver 56 may perform the combinatorial carrier phase search by applying a digital rotation of the sampled signal phase at epoch time $t_0$ for each PRN code signal prior to correlation. For example, an exhaustive search using 45 degree phase increments for five PRN code signals corresponds to $8^5=32,768$ possible combinations. The search may be efficiently synthesized using specially designed electronic circuits (e.g. Application Specific Integrated Circuits or ASICS) which implement large numbers of correlators for searching for maximum combined power over the entire search space, this search space consisting of the grid point, user clock error search and carrier phase combinatorial search. Additionally, the use of smaller carrier phase increments will reduce signal processing losses, but also causes an increase in computational burden or electronics hardware complexity. A reduction in carrier phase combination search space is possible using known signal phase relationships for each satellite 52.

At each grid search point, the user receiver 56 assumes that this particular grid search point is a probable location of the user receiver 56. During the processing, the user receiver 56 adjusts each internal PRN coder phase to an associated relative code phase as predicted by the Equations above. Additionally, the user receiver 56 correlates output data of the fore mentioned associated PRN coder with down converted and frequency corrected data received from the user receiver 56. If the user clock time offset and range offset associated with predicted code phase and the search space grid point corresponds to the actual user receiver range, there will be a power output corresponding to signal presence. If the presumed assumption is incorrect, the power output will correspond to only noise. In challenging environments (e.g. in-doors or under interference conditions), the power output from one correlator may be insufficient to reliably detect the PRN code signal. When the power output from the "N" PRN code signals are coherently combined, the reliability of the detection of the PRN code signals are much improved. By coherently combining the correlator outputs from each of the received GPS satellite ranging signals, the PRN code signals can be acquired simultaneously at the probable user receiver location.

Following an initial search of the PRN code signals, detection of the PRN codes signals, determination of the probable location of the user receiver 56, a subsequent refining search for the location of the user receiver 56 location may be performed. Such refinement may involve adjusting the search space grid 58 in smaller steps (e.g. 1/10 code chip spacing) relative to an initial grid point solution until the power is further maximized, or by using small code phase adjustments to implement code phase error processing.

For the base station 54 and the user receiver 56 processing of data associated with multiple frequency bands, the inter-frequency bias for the base station 54 and the user receiver 56 is kept small relative to a code chip (C/A code chip is about 1 microsecond, and P(Y) code chip is about 0.1 microsecond). Alternatively, an additional small search layer associated with this bias may be necessary if coherent combining of all signals from all frequency bands is desired. However, significant processing gain may be achieved by only processing PRN code signal from one frequency band. For example, each satellite 52 may have two civil and two military signals on Earth coverage L1, so that ten satellites 52 in view could deliver a factor 40 (16 dB) advantage over the acquisition of one signal only, assuming satellite PRN code signals of comparable received power levels.

Without a high-quality, accurate and stable user receiver 56 oscillator or the base station frequency aiding as described above, an additional search over the user receiver oscillator frequency offset may also be needed, and coherent integration time duration may be limited. In this case, the extent of the additional frequency search space will depend on the frequency error of the oscillator, and the duration of the coherent integration time will depend on the stability of the oscillator.

To extend coherent integration time for each PRN code, the processing includes frequency correction for a satellite 52 Doppler relative to the user receiver 56. For long integration times, in order to maintain phase coherency over the correlation interval, the captured GPS signal sample data or internally generated code and phase data is also phase corrected for any satellite 52 or significant user receiver 56 motion over the correlation interval. On the other hand, an operator can eliminate the user receiver motion degradation by simply holding the user receiver 56 still for a few seconds after pushing a button associated with the user receiver 56 while the broadcast GPS signal data is captured. Additionally, correction for the user receiver 56 differential Earth rotation affects is not necessary for search area grids within 10 km×10 km.

In another embodiment, if GPS Nav data stripping is applied (e.g. to extend the coherent integration time beyond the NAV message data bit transition boundary), to facilitate this data stripping, the user receiver 56 preferably samples at an appropriate time when the data bits can be predicted over the correlation interval. The base station 54 preferably provides the aiding and code phase information near the same time.

In a further embodiment, if message data cannot be predicted and relayed to the user receiver 56 in advance of signal reception by the user receiver 56, the user receiver 56 can buffer the digitized data, and wait for a feed forward of the NAV message data from the base station 54 wireless assist link, prior to processing.

In yet another embodiment, the user receiver 56 coherently integrates on dataless chips or channels, which will be available on future modernized L2 and L5 civil and other signals.

It should be noted that reduced performance is possible along with reduced processing complexity, with short coherent integration time durations limited to one NAV data symbol interval, and if the correlator power outputs are combined non-coherently, e.g. by squaring the power outputs from In-phase (I) and quadra-phase (Q) channels, and then summing $I^2+Q^2$ for all of the PRN code channels.

In another embodiment, instead of the base station 54 providing the aiding data, the aiding data may be sent from a cell phone station, a communications satellite that also provides a time synch and geolocation service, a navigation signal-of-opportunity, or derived from a suitably designed second GPS/wireless device within a local network of GPS/wireless devices.

In a further embodiment, in challenging environments, repeated snapshot type of acquisition/position fixes may enable a robust acquisition/reacquisition and subsequent quasi-continuous time navigation capability in situations when continuous tracking of the GPS PRN code signals may fail. In less challenging environments, a hand-off of the above derived solution to initialize satellite PRN code and carrier signal tracking loops, vector delay lock loop, or ultra-tight coupling implementation to continuously track all of the GPS satellite ranging signals in view, validate the solution, demodulate the Nav message data, and refine the position, time, and velocity estimates. In particular, this implementation herein also provides a robust technique to initialize ultra-tight GPS/INS (inertial navigation system) coupling implementations in interference prone environments.

The method 10 and system 50 provided herein enables automatic removal of errors common to both the base station 54 and user receiver 56 and is immune to multipath affecting one or a few satellite ranging signals. Processing by the base station 54 helps to minimize an introduction of multipath errors into ranging data sent to the user receiver 56.

While various preferred embodiments have been described, those skilled in the art will recognize modifications or variations that might be made without departing from the inventive concept. The examples illustrate the disclosure herein, and are not intended to limit it. Therefore, the description and claims should be interpreted liberally with only such limitation as is necessary in view of the pertinent prior art.

What is claimed is:

1. A method for rapidly acquiring and using a plurality of satellite ranging signals having satellite codes to rapidly determine a real time position of a user receiver, the method comprising:
 using a wireless assist link to transmit to the user receiver, from a base station, a set of initialization data and base-station-location data to limit a search space grid, in which the user receiver is located, to predetermined geographic dimensions;
 wherein using wireless link to transmit said initialization data and said base-station-location data includes using the base station to transmit to the user receiver:
  a time synch function to enable the user receiver to synchronize a user receiver clock associated with the user receiver, and
  satellite ranging data at an epoch time, the satellite ranging data having been previously received at the base station;
 using the user receiver to search a plurality of grid points locations making up the search space grid based on the base-station-location data and acquire simultaneously at least one of the satellite codes from a plurality of satellites in view of the user receiver; and
 when a plurality of satellite codes are received at any one or more of the grid point locations, using the user receiver to coherently combine the power outputs of the received satellite codes at each one of said grid points, and to detect therefrom a probable location of the user receiver.

2. The method of claim 1, wherein the set of initialization data and the time synch function are used to predict at least one satellite code phase for each of the plurality of satellites in the search grid.

3. The method of claim 2, wherein each said satellite code phase at a grid point is predicted using geometric relationships relative to the base station.

4. The method of claim 3, wherein each said predicted satellite code phase at the grid point is used to acquire simultaneously a plurality of satellite ranging signal code phases as received by the user receiver.

5. The method of claim 1, wherein the operation of coherently combining the received satellite codes comprises:
 analyzing a power output produced by each of the received satellite codes at each of said plurality of grid point locations in geographic dimensions;
 summing coherently all of the power outputs of satellite codes received from each of the plurality of grid point locations; and
 determining when a summed power output indicates a maximum power value for the plurality of grid point locations within the geographic dimensions to identify the probable location of the user receiver.

6. The method of claim 1, further comprising:
 providing time aiding to reduce error time of the user receiver and aid acquisition of the satellite codes;
 providing frequency aiding to reduce or eliminate the frequency search space; and
 adjusting a code phase for any change in satellite motion since the epoch time.

7. The method of claim 1, wherein the geographic dimensions comprises a two-dimensional grid or a three-dimensional grid of Earth coordinates.

8. The method of claim 7, wherein the two-dimensional grid comprises no greater than about 10 km×10 km square.

9. The method of claim 1, wherein the set of initialization data comprises at least one of:
 almanac data;
 satellite ephemeris data;
 clock data; and
 size or boundary data, and base station ranging measurements for the search space grid.

10. A method for determining a position of a user receiver using satellite ranging signals, comprising:
 transmitting to a user receiver, from a base station via a wireless assist link, initialization data including time synchronization data to enable said user receiver to synchronize to a clock of said base station, and base-station-location data to limit a search by the user receiver for a plurality of satellite ranging signals to a predetermined geographic area circumscribing a present location of the user terminal;
 using the user receiver to search within the predetermined geographic area having a plurality of grid point locations for each of the plurality of satellite ranging signals from each spaced-based GPS satellite that is within view of the user receiver;
 using the user receiver to combine, coherently, a power output of all received ones of said ranging signals at each of the plurality of grid point locations within the predetermined geographic area, to determine a maximum power output value; and
 having the user receiver use the maximum power output value to determine a probable location of the user terminal.

11. The method of claim 10, further comprising:
 searching over at least one carrier phase combination within the geographic area to detect and acquire simultaneously all of the GPS satellite ranging signals sent by the satellites in view of the user receiver;
 using time aiding to reduce time error of the user receiver and aid the search;
 using frequency aiding to reduce or eliminate frequency search space; and
 estimating the probable location for the user receiver relative to the base station based on selecting a combined signal power that corresponds to a maximum combined power over the geographic area.

12. The method of claim 11, wherein the maximum power output value is indicative of a highest summed power output of all said satellite ranging signals present for each of the grid point locations, that identifies the probable location of the user receiver.

13. The method of claim 10, further comprising:
reducing the geographic area based on the probable location;
searching over at least one carrier phase combination within a reduced search area grid to detect and acquire simultaneously a second set of GPS satellite ranging signals;
detecting a grid point location within the reduced search space grid;
adjusting a code phase for any change in satellite motion since epoch time;
combining coherently each satellite code of the second set of GPS satellite ranging signals at the grid point location to produce a second combined power output;
determining whether the second combined power output indicates a refined location for the user receiver; and
estimating the refined location of the user receiver relative to the base station within the reduced search area grid.

14. The method of claim 10, wherein the geographic area further comprises a two-dimensional group of Earth coordinates of no larger than about a 10km×10 km square.

15. The method of claim 10, wherein the geographic area further comprises a three dimensional group of Earth coordinates.

16. The method of claim 10, wherein the initial data comprises almanac or satellite ephemeris and clock data, satellite PRN ranging data including satellite ranging measuring data as received at the base station at an epoch time, and size and boundary data to limit the search space grid, in which the user receiver is located.

17. A global positioning system (GPS) for rapidly determining a position of a user receiver from satellite ranging signals from a plurality of satellites in view of the user receiver, comprising:
a plurality of GPS satellites configured to produce a plurality of GPS satellite ranging signals having a pseudo random code;
a base station having a base station receiver clock, and configured to generate a set of initialization data including a time synch function, and base-station-location data to limit a search space grid to predetermined geographic dimensions, the base station is further configured to receive the plurality of GPS satellite ranging signals to produce time aiding data to synchronize a user receiver clock to reduce time error for the search space grid and aid acquisition of the plurality of GPS ranging signals and to transmit the time aiding data and the set of initialization data; and
a user receiver in wireless communication with the base station and is configured to receive the set of initialization data and the time aiding data, the user receiver is further configured to receive the time synch function to synchronize a user receiver clock with the base station receiver clock, and ranging data associated with said ranging signals, at an epoch time, the user receiver configured to search a plurality of grid points within the search space grid based on the base-station-location data and to acquire simultaneously each of the ranging signals at each said grid point from the plurality of satellites in view of the user receiver, and the user receiver being further configured to coherently sum power outputs of the received ranging signals from satellites that are received at each of one said grid points, to determine a maximum power output at each said grid point, and to use said maximum power output to detect therefrom a probable location of the user receiver.

18. The system of claim 16, wherein the user receiver is further configured to refine the probable location by searching over at least one carrier phase combination within a reduced search area grid and to estimate a refined location of the user receiver relative to the base station.

19. The system of claim 18, wherein the maximum power output corresponds to a highest power output of the plurality of grid point locations found within the search space grid, such that the maximum power identifies the probable location.

* * * * *

UNITED STATES PATENT AND TRADEMARK OFFICE
CERTIFICATE OF CORRECTION

| | | |
|---|---|---|
| PATENT NO. | : 7,579,986 B2 | Page 1 of 1 |
| APPLICATION NO. | : 11/376681 | |
| DATED | : August 25, 2009 | |
| INVENTOR(S) | : Raymond S. DiEsposti | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 52 days.

Signed and Sealed this

Fourteenth Day of September, 2010

David J. Kappos
*Director of the United States Patent and Trademark Office*